United States Patent
Elsensohn et al.

(10) Patent No.: US 8,615,348 B2
(45) Date of Patent: Dec. 24, 2013

(54) REGULATION METHOD FOR A CONTROLLABLE ENERGY ABSORBER

(75) Inventors: Gernot Elsensohn, St. Anton i.M. (AT); Stefan Battlogg, St. Anton i.M. (AT); Jürgen Pösel, Bludenz (AT)

(73) Assignee: ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 13/696,233

(22) PCT Filed: Apr. 1, 2011

(86) PCT No.: PCT/EP2011/001646
§ 371 (c)(1),
(2), (4) Date: Nov. 5, 2012

(87) PCT Pub. No.: WO2011/141097
PCT Pub. Date: Nov. 17, 2011

(65) Prior Publication Data
US 2013/0054094 A1    Feb. 28, 2013

(30) Foreign Application Priority Data
May 10, 2010    (DE) .......................... 10 2010 020 087

(51) Int. Cl.
| | |
|---|---|
| *B60R 21/00* | (2006.01) |
| *B60R 21/05* | (2006.01) |
| *B60R 21/203* | (2006.01) |
| *B60R 25/21* | (2013.01) |
| *B62D 1/10* | (2006.01) |
| *B62D 1/16* | (2006.01) |
| *B62D 1/18* | (2006.01) |
| *B62D 1/184* | (2006.01) |
| *B62D 1/189* | (2006.01) |
| *B62D 1/19* | (2006.01) |
| *B62D 1/20* | (2006.01) |
| *B60R 16/027* | (2006.01) |

(52) U.S. Cl.
USPC .............. 701/45; 701/32.2; 701/41; 701/300; 701/301; 701/302; 701/36; 701/49; 180/78; 280/775; 280/777

(58) Field of Classification Search
CPC ...... B60R 21/00; B60R 21/05; B60R 21/203; B60R 21/2032; B60R 25/021; B60R 25/02105; B60R 25/0211; B60R 25/02134; B60R 25/02153; B60R 25/02156

USPC ............ 701/32.2, 41, 45, 300–302; 180/232, 180/234, 240, 252–253, 280, 78, 400, 406, 180/414, 417
See application file for complete search history.

(56) References Cited

U.S. PATENT DOCUMENTS 6,152,488 A * 11/2000 Hedderly et al. ............. 280/775
6,279,952 B1 * 8/2001 Van Wynsberghe et al. . 280/777
(Continued)

FOREIGN PATENT DOCUMENTS

| EP | 0979768 A2 | 2/2000 |
|---|---|---|
| EP | 2156988 A1 | 2/2010 |
| KR | 2009124651 A | * 12/2009 |

OTHER PUBLICATIONS

International Search Report issued in PCT/EP2011/001646, mailed Jul. 6, 2011 with English translation.
(Continued)

*Primary Examiner* — Mary Cheung
*Assistant Examiner* — Atul Trivedi
(74) *Attorney, Agent, or Firm* — Novak Druce Connolly Bove + Quigg LLP

(57) ABSTRACT

The invention relates to a method for regulating the current flow of a coil that controls the viscosity of a magnetorheological fluid of a controllable energy absorber in a steering system for a motor vehicle, wherein during an accident the energy absorber acts as a hydraulic damper between two parts movable with respect to one another, whose damping force is determined by the current flow through the magnetic coil, wherein the following steps are provided:
 the relative velocity between a first part of the steering column movable with the steering wheel and a second part of the steering column fixed to the vehicle body is determined continuously or at intervals,
 the acceleration required for the braking from the measured relative velocity at standstill up to the end of the travel path is calculated,
 the current flow is calculated from the calculated acceleration in such a way that the value of the acceleration is approximately reached during the further travel of the parts movable with respect to one another.

17 Claims, 4 Drawing Sheets

(56) References Cited

U.S. PATENT DOCUMENTS

Figure 1:
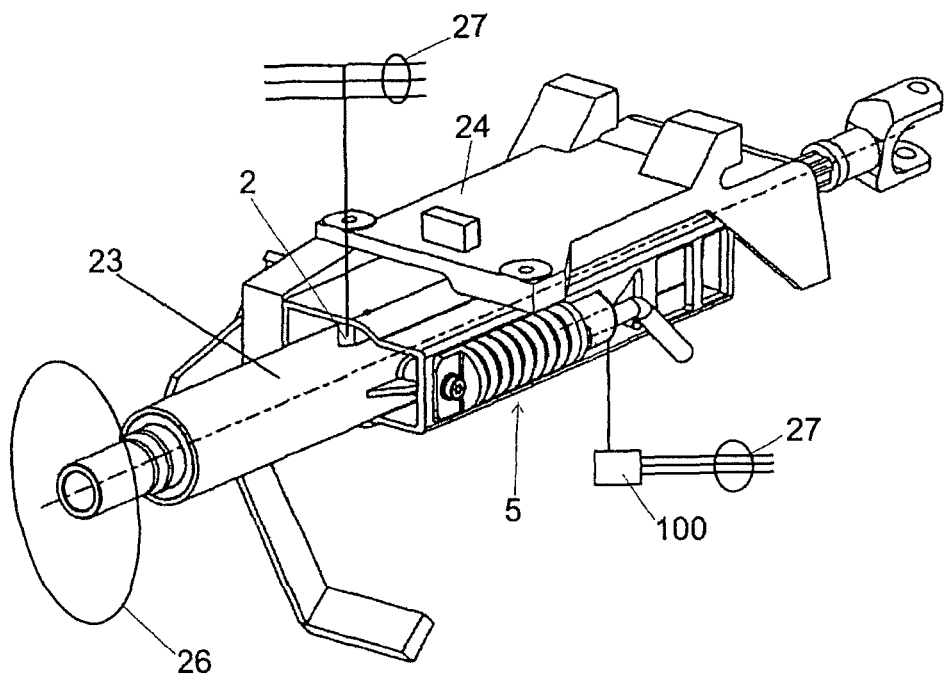

| | | | |
|---|---|---|---|
| 6,354,626 B1* | 3/2002 | Cartwright | 280/777 |
| 7,165,786 B1* | 1/2007 | Sha et al. | 280/775 |
| 7,677,370 B2* | 3/2010 | Battlogg et al. | 188/267.2 |
| 7,922,202 B2* | 4/2011 | Battlogg et al. | 280/777 |
| 8,251,402 B2* | 8/2012 | Battlogg et al. | 280/777 |
| 2002/0103589 A1* | 8/2002 | Millsap et al. | 701/42 |
| 2008/0163716 A1* | 7/2008 | Battlogg et al. | 74/493 |
| 2009/0024281 A1* | 1/2009 | Hwang | 701/42 |
| 2009/0033082 A1* | 2/2009 | Klukowski | 280/777 |
| 2010/0045010 A1* | 2/2010 | Battlogg et al. | 280/742 |
| 2010/0045011 A1* | 2/2010 | Battlogg et al. | 280/742 |

OTHER PUBLICATIONS

International Preliminary Report on Patentability issued in International Application No. PCT/EP2011/001646 report issued Nov. 13, 2012.

* cited by examiner

REGULATION METHOD FOR A CONTROLLABLE ENERGY ABSORBER

CROSS-REFERENCE TO RELATED APPLICATIONS

This Application is a National Stage of PCT International Application No. PCT/EP2011/001646, filed on Apr. 1, 2011, and claims priority of German Patent Application No. 10 2010 020 087.5, filed on May 10, 2010. The disclosures of the aforementioned applications are incorporated herein in their entirety by reference.

The present invention relates to a method for regulating an energy absorber with the features of the preamble of claim 1 or 2.

Furthermore the invention relates to a device with the features of the preamble of claim 7.

The general technical field with which the present invention is involved is the deceleration of occupants of a vehicle during an impact, in particular in order to avoid unnecessarily high acceleration forces that act on the body of a vehicle occupant. This will be illustrated hereinafter with the example of the driver of a vehicle.

In the event of an impact in the direction of travel a vehicle is subjected to high deceleration forces. For example, in the case of a frontal impact with a solid obstacle a deceleration of 50 km/h to a standstill can occur in a distance of 1 meter, which corresponds to the available deformation path of the vehicle. In the same way the driver of the vehicle is also decelerated from the initial velocity to a velocity 0. The safety systems used at the present time in vehicles, mainly safety belts and airbags, should aim to ensure that the deceleration of the affected vehicle occupants takes place as uniformly as possible and that acceleration peak values are avoided.

It is generally assumed that at decelerations of more than 50 G the effects on the human body are so serious that a corresponding impact will lead to fatal injuries. This is true in particular for the head and upper body region. Numerous technical solutions are therefore proposed and also employed in order to minimise these acceleration loads during an impact. A technical solution that has long been used consists in equipping the vehicles with telescopically collapsible steering columns, which are fitted with energy absorption devices, for example with a steering spindle partly formed as a lattice-type tube. With a strong impact of the driver, with or without an airbag, against the steering wheel, on the one hand additional energy is absorbed by the collapsible steering column and on the other hand an additional path is made available via which the driver can be decelerated after an impact against the steering wheel. The energy absorption device of the steering unit is particularly important insofar as it can always act, in contrast to a belt (driver not wearing the belt) and airbag (not inflated since the driver is "out of position").

More developed technical solutions are mentioned for example in DE 60 2004 012 021 T2. In this printed specification it is proposed to equip the steering column with bending strips or splinter brackets, which are deformed or fractured at high impact forces and thereby absorb energy and at the same time make available an additional deformation path.

Since the kinetic energy to be dissipated in the steering system depends on various parameters, in particular also on the weight of the driver, the sitting position of the driver, the way and manner whether and how the safety belt is attached and similar other factors, in this printed specification it is also proposed to control or regulate the absorption behaviour in such a way that the energy dissipation is appropriately adapted. For this purpose it is proposed to integrate a plurality of absorption elements into the energy absorption system, whereby by means of a pyrotechnic switch it is determined in the relevant crash situation how many of these existing energy absorption agents (bending strips or splinter brackets) are engaged and correspondingly contribute to the energy dissipation. This solution has the disadvantage that an adaptation to the corresponding parameters is only possible in coarse gradations and these systems are subject to great variations due to the production. In addition an adaptation can be carried out only once: a pyrotechnically actuated switch cannot be reset, for example if in the course of an accident parameters such as the belt force or weight distribution alter. In addition the parameters have to be measured, which for example requires sensors in order to determine the driver's weight.

In the printed specification DE 10313469 A1 it is proposed to solve this problem with the aid of a deformable strip, which acts as an energy absorption agent. This strip is deformed to a varying degree depending on the requirements. In particular it is envisaged that in the case of an impact, then as a result of the deformation of the metal strip the reaction force and the reaction moment engage at a deforming element and lead to a change in position of the deforming element and thus to a change in the strength of the deforming force. In this way a specific adaptation to the energy impacting on the steering column is possible. However, no high functional reliability is guaranteed in this case, since the reaction depends largely on the respective existing frictional conditions. Varying distances/tolerances and differences in material properties due to manufacture have a large influence on the deforming force. Furthermore a motor is provided in order to adjust the force level as a whole. This technical solution is complicated, and owing to the mechanics (moved masses) can be implemented only with a limited adjustment speed.

In order to improve the controllability of the energy absorption technical solutions are proposed in WO 2007002970 and WO 2007068436, in which when the steering column telescopically collapses in the manner of a damper a piston compresses a chamber containing a magnetorheological fluid. The magnetorheological fluid is compressed by a suitably electrically controllable valve, which, due to its variable magnetic field, alters the viscosity of the magnetorheological fluid and thus the resisting force against the movement of the piston. This structural element offers the possibility of being able to vary the magnetisation of the magnetorheological fluid by activating an electromagnetic coil at the moment of impact, and thereby adjusting the damping behaviour of the damping member. The regulating speed and the adjustment speed of the damping properties are in this case in the region of about 1 millisecond, which is sufficiently fast in order to be able to repeatedly engage in a regulatory manner during the duration of an impact, which on average is 30 to 100 milliseconds, preferably 1 second. A suitable regulation method is however not proposed in these printed specifications.

Such a method for a hydraulic damper is proposed in the printed specification DE 60009208 T2. Here too the basic principle is first of all a steering column, which can be driven in the axial direction along a deformation path and in addition is swivelable. A magnetorheological damper controllable by magnetic fields is inter alia proposed, which during an impact can be controlled as regards its damping properties via an electrically generated magnetic field. The method envisages however that the acceleration acting on the vehicle occupants is regulated by the damping of the steering column in such a way that specific predetermined acceleration values are not exceeded. Thus, the acceleration can be measured for example by means of acceleration sensors that are associated with the steering wheel, and can be limited for example to 25 G, which in many cases is sufficient to prevent fatal injuries. It is found however that especially in the case of serious accident scenarios this regulation is not optimal, since if an acceleration below the predetermined limiting value acts along the travel path of the steering column during the impact, it may then be the case that this acceleration is not sufficient to decelerate the vehicle occupant from the initial velocity to 0. In this case the steering wheel impact violently against a limit stop at the end of the travel path or compression path. The acceleration thereby occurring and briefly acting then possibly exceeds the preselected limiting value for the regulation of the energy absorption device as well as the upper limit of ca. 50 G, above which fatal injuries are to be expected. As a consequence this means that the regulation proposed in the aforementioned printed specification minimises the risk of injury for fairly serious accidents, but does not optimally reduce the risk of fatal injuries in the case of serious accidents.

The object of the present invention is accordingly to provide a regulation method for a hydraulic energy absorber based on a magnetorheological fluid in a passenger protection device, in particular for vehicles, by means of which the occurrence of acceleration peak values at the end of the travel path of the energy absorption device, for example a steering column, is avoided. The method according to the invention, despite employing a relatively simple construction, enables the hydraulic damper and energy absorber to be controlled so that the driver is always optimally decelerated within the limits of the system, i.e. as constantly and with as little force as possible, so that his relative velocity at the end of the travel path is 0.

This object is achieved with a method having the features of claim 1 or 2. Advantageous modifications of the invention are disclosed in the sub-claims.

Since in the case of a crash the relative velocity between a first part of the steering column, movable with the steering wheel, and a second part of the steering column, fixed to the vehicle body, is measured continuously or at intervals, then the necessary braking acceleration for braking from the measured velocity up to the end of the deformation path is calculated and finally from this the control current for the at least one coil of the controllable damping unit is controlled so that the magnetic field of the coil leads to a viscosity of the magnetorheological fluid so that this deceleration is approximately achieved, and in this way it is ensured that even in the case of serious accidents the relative velocity of the displaceable part of the steering column, which basically moves at the same velocity as that impacting on the vehicle passenger, is reduced to such an extent that at the end of the available compression path the relative velocity becomes 0 or does not exceed a specific limiting value, whereby the occurrence of an acceleration peak at the end of the travel path of the steering column is avoided.

It is also possible that the regulator to start with reaches the velocity profile from the starting velocity and the deceleration path, after which the velocity has to behave in a time-dependent or path-dependent manner in order to become 0 at the end of the path. In the course of the movement the regulator adapts the counterforce of the energy absorber so that the target velocity and actual velocity coincide. It is conceivable that the velocity profile is updated, i.e. recalculated, in the movement behaviour depending on the time, path or other parameters.

Advantageously the necessary velocity behaviour at standstill at the end of the travel path is calculated depending on the travel path or depending on the travel time.

In a further variant of the method the relative velocity and/or the travel path still available is determined from the signals from at least two acceleration sensors, wherein at least one acceleration sensor is mounted on the displaceable part of the steering column and at least one further acceleration sensor is fixedly mounted on the vehicle body.

A further embodiment envisages that the position, path, velocity and/or acceleration values required for the regulation are determined directly or indirectly via other physical quantities by at least one sensor.

It is also preferred to design the regulation of the deceleration to be independent, i.e. not connected to other retention systems, control devices or sensors. In particular the method for the regulation can be integrated in an existing control device, such as for example the airbag control device.

It is also conceivable and possible to optimise the regulation method by providing a communication of the control to other retention systems, control devices and/or sensors. In this way it is possible to combine the regulation of the energy absorber jointly with other retention systems and to control the deceleration so that the loading of the driver is minimised. To this end a master control can advantageously set predetermined values for the control of the energy absorber and/or can directly take over the regulation of the force of the energy absorbers.

Even though with this regulation method higher acceleration values can act on the vehicle occupants compared to the prior art, nevertheless it is avoided that a relatively low acceleration acts on the vehicle occupant over the travel path, although the remaining kinetic energy at the end of the travel path generates due to the serious impact an acceleration peak leading to very serious injuries. The probability of surviving a serious accident is increased by this regulation method compared to the prior art.

The aforementioned object is also achieved by a device having the features of claim 17. Since a suitable sensor for recording the path is provided in order to determine the relative position of the driver's side part of the steering column and the vehicle side of the steering column, during an accident the position of the displaceable part of the steering column along the travel path can be measured and from the time behaviour of this position the relative velocity and from this finally the necessary deceleration for the braking of the vehicle occupant up to the end stop of the steering column can be calculated. In this way the current signal that is required in order to brake the driver by means of a regulation of the coil current of the damping unit can be calculated in such a way that the braking acceleration and deceleration or acceleration is just as high as is necessary for the complete braking, and no force peaks occur.

The sensor is preferably a digital path sensor, so that each path change can be detected directly and without computational effort. An A/D converter for the signal conversion can for example thereby be dispensed with, compared to a potentiometric path sensor. In another embodiment it may be envisaged that the driveable part of the steering column as well as the part of the steering column fixed to the body are provided with an acceleration sensor, wherein the path and the velocity of the driver's side part of the steering column relative to the part of the steering column fixed to the body can be calculated from the difference of the recorded accelerations during the impact. This method is more complicated, but due to the integration of the acceleration provides lower noise velocity values and path values (the noise is intensified by diverting a path signal). Also further methods for the direct or indirect determination of position, path, velocity or acceleration can be employed, these being identified hereinafter as "path sensor".

A path sensor is preferably used that converts the linear movement into a rotational movement and is designed as an optical encoder or as a magnetic rotary encoder. Magnetic rotary encoders have long been tested in particular in motor vehicles, for example in antiblocking systems to record the wheel rotational velocity.

For the regulation it is possible to read the sensor not at a fixed scanning frequency, but to adapt the scanning frequency and/or regulating frequency to the actual travel velocity. This can be continued until the regulator no longer operates in a time-synchronised manner but in a path-controlled manner. For this, each path step or a multiple of each path step of the (digital) path sensor triggers a regulating cycle, and the time between the path steps enables the velocity and acceleration to be calculated. An essential advantage of this method is that the resolution of the path sensor can be relatively coarse, which significantly facilitates series production on account of lower production costs. The time resolution of the processor-internal time can be varied very easily and if necessary can be enlarged relatively favourably, for example by a higher scanning frequency.

The whole method according to the invention can therefore be carried out with only one sensor, wherein the corresponding sensor can be implemented comparatively simply, robustly and inexpensively. Further sensors or interfaces at existing control devices are not necessary.

If the controllable energy absorber is arranged coaxially in the steering column, the path sensor is preferably associated directly with the energy absorber, so that even if the steering column is deformed the path signal represents precisely the deceleration path already travelled and the deceleration path still available.

An electronic system is necessary for regulating the energy absorption. This system comprises on the one hand a microcontroller, which is suitably programmed to calculate the regulating quantity from the sensor signals, and on the other hand a power electronics arrangement that regulates the coil current so that the calculated deceleration values are at least approximately reached. In this connection it may be envisaged that the magnetorheological fluid is subjected by means of a permanent magnet to a magnet field that corresponds to a mean damping force. The power electronics arrangement then has to create if necessary an amplifying or attenuating magnetic field via the coil, in order to adapt the damping to the requirements. The whole magnetic field does not have to be electrically generated. In case of a detect a mean damping is still provided by the permanent magnetic field, whereby a defined emergency running function can be adjusted, whose force substantially corresponds to a one-stage system according to the prior art.

It may furthermore be envisaged that the electronics are in a rest state during the normal operation of the motor vehicle and that the electronics are activated in general only in the case of a crash, for example by the airbag control device. This can take place in that the airbag control device first of all releases the airbag, which requires a certain amount of time for its activation, and then starts the regulation of the energy absorption device.

This has the advantage that no unnecessary energy is wasted by constant operation of the regulating device. It may however also be envisaged to regulate the energy absorption device by the airbag control device itself, since the control device has in any case become functionless after the actuation of the airbag and its computing power as well as the sensors connected thereto are furthermore available.

A particular advantage of the method according to the invention is that possible interfering quantities such as force fluctuations due to non-uniform frictional resistance in guides or non-uniform belt force, temperature related viscosity fluctuations, production related component tolerances, etc., are automatically taken into account and compensated within the system boundaries by an adapted force of the energy absorber.

Also, changes in the accident parameters during the deceleration process can be taken into account as long as the end of the travel path is not reached.

Figure 2:
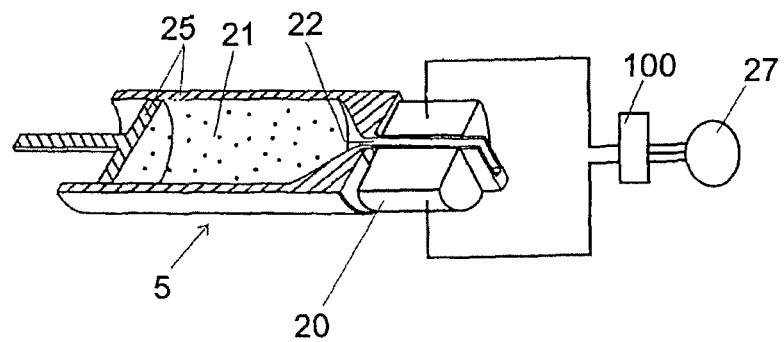
Figure 3:
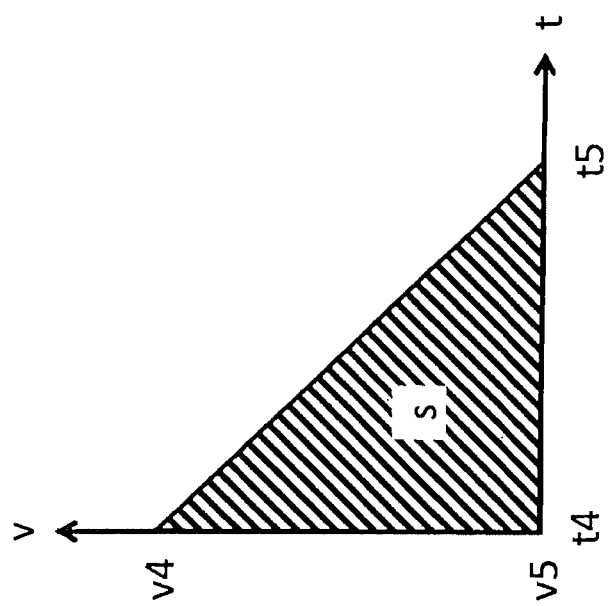
Figure 4:
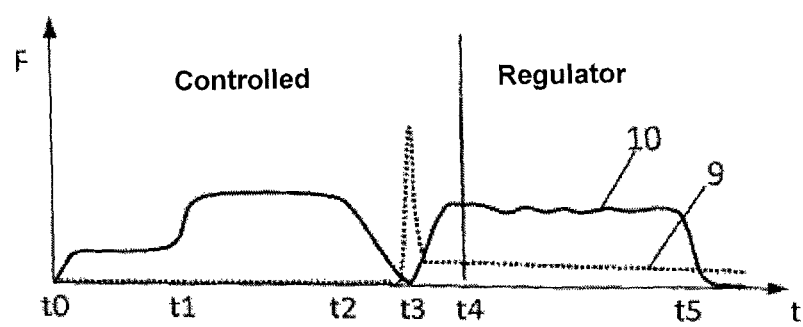
Figure 5:
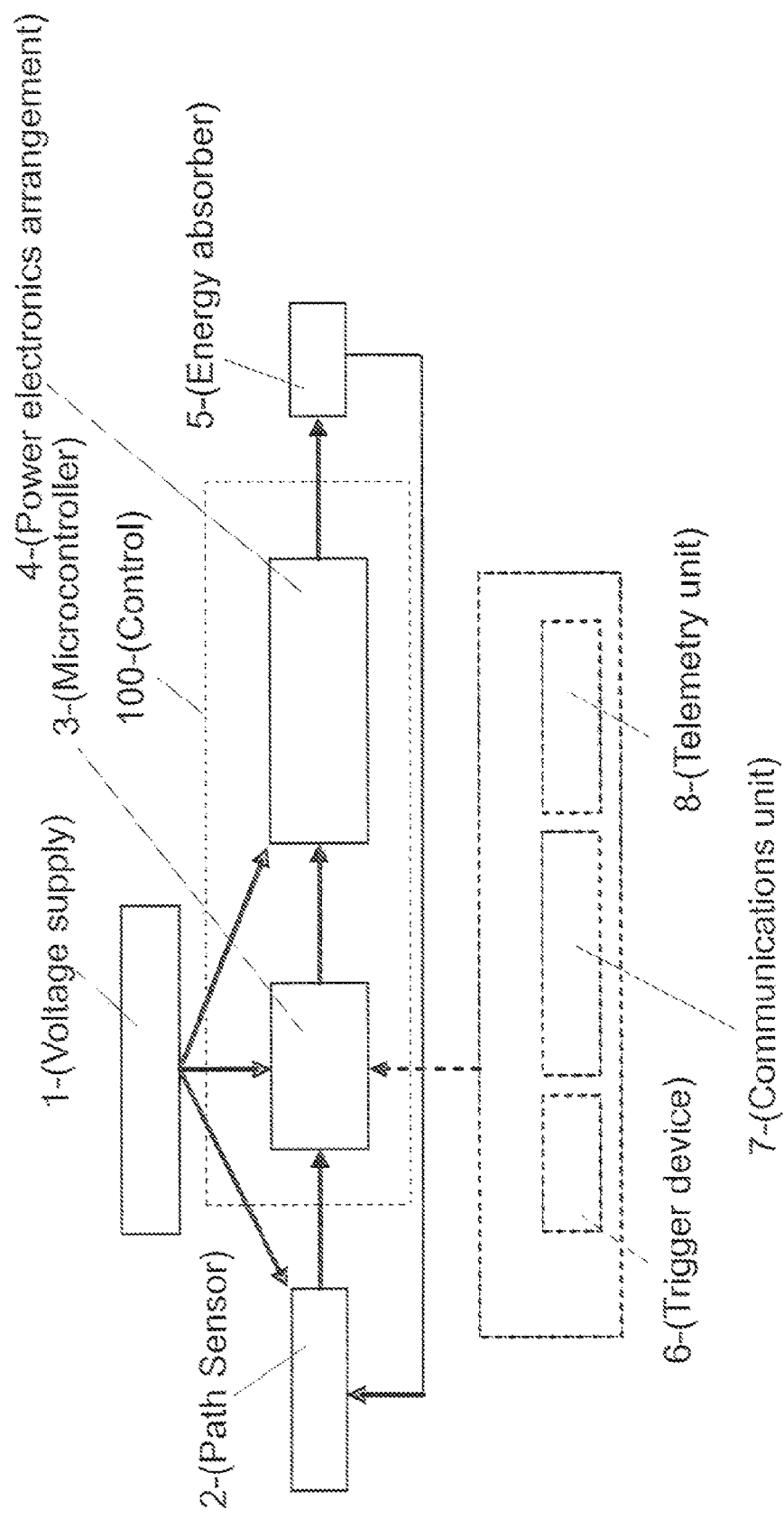

The present invention is described in more detail hereinafter with the aid of the drawings, in which:

FIG. 1: shows a steering column according to the invention with a regulated energy absorber;

FIG. 2: shows a section on an energy absorber corresponding to FIG. 1;

FIG. 3: shows the optimal time behaviour of the relative velocity from the impact velocity up to a standstill;

FIG. 4: shows the time progression of an accident involving a frontal impact against an obstacle, and more specifically with the example of the counterforce generated by the variably controllable energy absorption device as well as the counterforce generated by the conventional mechanics; and also FIG. 5: is a block diagram of the employed regulation.

FIG. 1 shows a steering column, in which the displaceable steering column part 23 is held on the vehicle body (not shown) by a steering column part 24 fixed to the body. In the event of an impact (crash) the displaceable steering column part 23 is displaced in its longitudinal direction with respect to the steering column part 24 fixed to the body, by the impact of the driver against the schematically illustrated steering wheel 26. The energy absorber 5 is fixed with its one end to the displaceable steering column part 23 and with its other end to the steering column part 24 fixed to the body.

FIG. 2 shows a section through the energy absorber 5. This comprises a piston-cylinder unit 25, which is filled with a magnetorheological fluid 21. In the event of a crash the piston is displaced in the cylinder, so that the magnetorheological fluid is forced through the constriction point 22 into an outflow duct. The viscosity of the magnetorheological fluid 21 can be altered by the magnetic field of the coil 20, whereby also the force acting on the piston-cylinder unit 25 and thus the deceleration of the moved masses comprising driver, steering wheel 26 and displaceable steering column part 23, can be altered. The coil current is determined by a control 100.

A path sensor 2 measures the travel path of the displaceable steering column part 23 with respect to the steering column part 24 fixed to the vehicle body. The path information is transmitted to the control 100 via a security bus 27. The control 100 determines the necessary current for energising the coil 20 on the basis of the path information of the path sensor 2 in order to adjust the desired deceleration of the energy absorber 5.

By means of additional sensors the regulator can be better adapted to the path stretch. For example the temperature of the magnetorheological fluid can be determined via the coil resistance and a corresponding regulatory adaptation can be carried out.

In the diagram shown in FIG. 3 the time t that is required with a uniform deceleration for the travel path is plotted on the X axis. The velocity v is plotted on the Y axis. The aim of the regulation is to reduce the initial velocity $v_4$ at time $t_4$ along as straight a line as possible until standstill (v5=0) at time t5, which has to be reached at the end of the available travel path s. The available travel path s corresponds to the shaded area in the diagram. The gradient of the line shows the acceleration and deceleration necessary for this purpose. A straight line denotes a constant deceleration over the travel path, and the direct connection between the initial velocity v4 and the point v5=0 defines the smallest possible deceleration at which the velocity v4 can be reduced to 0 over the stretch s. The deceleration a consequently depends only on the initial velocity and the braking distance s.

The force F necessary for a specific deceleration a depends however on the moved mass (F=m*a). If the regulator knows the moved mass, the regulation can be greatly simplified and the deceleration behaviour can be optimised. The regulator can however also be constructed completed independently, in other words at the start of a crash only the path is known. In order to calculate the missing parameters the regulator has to work out the data from the path signal and the processor-internal existing time. The following therefore applies: the smaller the dynamic range (range of possible velocities and masses) of the regulator has to be, the better the regulator can follow the optimal curve shape.

It is clear that at high impact velocities an equally high deceleration is necessary over the whole path in order to achieve the objective. If the deceleration is restricted, then the gradient of the time/velocity curve is flatter and at the end of the available crash path there exists a residual velocity, which leads to a sharp impact.

FIG. 4 shows by way of example the time behaviour of the counterforces acting on the energy absorber 5 from the start of an accident event. In this example a control curve is superimposed on the regulator, which presupposes that the regulation is in communication with other control devices and sensor.

The time t is plotted on the X axis, and the force F is plotted on the Y axis. The mechanical force behaviour 9 illustrates the counterforces applied by the steering column against the displacement of the displaceable part of the steering column caused by the impact of the driver. The energy absorber/force behaviour 10 illustrates the counterforce produced by the energisation of the coil of the energy absorber against a displacement of the displaceable part of the steering column.

At time t0, which possibly lies before the actual impact, the vehicle's internal safety systems establish that there is an accident. The first safety devices are actuated, for example the belt inertia system, the seat adjustment and the like. The energy absorber 5 already produces a relatively higher damping force in order to prevent a travel of the steering column 23 due to inertia.

At time t1 the airbag is inflated. The counterforce of the energy absorber 5 is increased once more beforehand in order to prevent the travel of the steering column due to the resultant momentum of the release of the airbag.

At time t2 the control 100 calculates the imminent impact of the driver against the steering wheel 26, which may possibly be notified by information from the safety belt system. The steering wheel 26 and the steering column 23 itself already counteract with a force 9 due to their mass inertia and frictional forces the impact of the driver, to which is added the force of the energy absorber 10. In order to restrict the total force acting on the driver, at this moment the damping force of the energy absorber 10 is reduced. Compared to the prior art the loading of the driver can be significantly reduced since a breakaway element can be dispensed with.

The control 100 increases the damping force of the energy absorber 5 immediately after the impact to a start value calculated from the existing accident parameters.

At time t4 the region of the uniform deceleration of the driver is reached, and the regulator takes over the calculation of the optimal deceleration based on the data of the path sensor 2 until standstill. The counterforce of the energy absorber 5 is constantly checked and adapted. The transition from the control to the regulation can take place continuously and uninterruptedly, or also abruptly depending on the time, the path, the signal quality and the result of the internal regulation algorithms.

At time t5 the standstill of the movable part of the steering column 23 relative to the part 24 fixed to the body is reached, without coming to a stop means on account of a remaining residual velocity. In the optimal case the relative velocity becomes 0 when the end of the available path stretch is reached.

FIG. 5 shows the regulation system of the present invention as a functional block diagram. First of all a voltage supply 1 is provided, which supplies a path sensor 2, a microcontroller 3 and a power electronics arrangement 4 with electric current. The power electronics arrangement 4 and the microcontroller 3 form the control 100, which are illustrated in FIGS. 1 and 2. In a manner known per se the supply can be provided from the on-board network of the motor vehicle, wherein an energy reservoir such as a capacitor or separate battery may be provided, which provides the short-term high loads through the power electronics arrangement, also in the case of an interruption in the energy supply from the onboard network. This capacitor should be designed so that the supply of the power electronics arrangement and its microcontroller is ensured for at least 100 milliseconds. The power electronics arrangement 4 in turn controls a controllable energy absorber 5. The controllable energy absorber 5 is, as already described above, substantially formed as a hydrodynamic impact damper with a magnetorheological fluid, so that the damping force can be controlled via an external magnetic field, wherein the magnetic field can be varied by the current flowing through a coil. The formation can in this connection be implemented corresponding to the prior art, which is illustrated for example in WO 2007/068436 A1 and DE 60009208 T2.

Additional possible components include a trigger device 6, which starts the microcontroller in the case of necessity, as well as a communications unit 7 and a telemetry unit 8, which are described in more detail hereinafter.

The supply 1 should preferably operate independently and have a sufficient buffer capacity in order to supply sensors and electronics during an accident. A capacitor is provided as energy reservoir, which makes a relatively large amount of electrical energy available for a brief period. It may also be envisaged to provide separate batteries or accumulators, which are also provided if necessary for additional further security items in the system. A higher supply voltage, for example 24 volts, 48 volts or more, enables more energy to be stored in a smaller space ($E=(C*U^2)/2$). With a higher supply voltage the power electronics arrangement can also react more quickly on account of the inductivity of the electromagnetic coil of the energy absorber. The charging and the monitoring of the state of the energy reservoir can be undertaken by the microcontroller 3.

The path sensor 2 should preferably have a high resolution and be interference-proof. The path measurement requires a high dynamic. With a slow travel velocity at the end of the travel path sufficient information should still be generated in order to be able to resolve the path with sufficient accuracy at the corresponding scanning frequency. With high travel velocities at the start of the travel path, which typically can reach approximately 10 m/sec, the path sensor 2 should react correspondingly quickly.

On account of the relatively high travel velocity at the start potentiometric sensors are less suitable. The linear movement can be converted into a rotation, which can also include a translation. Digital sensors are more interference-proof than analog sensors in this area of use. In this way an additional analog/digital conversion is also saved, which avoids computing time, costs and the limited resolution of such internal A/D converters. Magnetic tape sensors or other inductive, resistive or capacitive sensors may for example be used, although optical encoders or magnetic rotary encoders are particularly advantageous.

The microcontroller 3 must be able to process the resultant high dynamics, which has already been discussed above in connection with the path sensor. In the simplest case a microcontroller with digital inputs and outputs and an internal timer is sufficient. The control of the energy absorber 5 should however take place via a pulse width modulation, in which connection an internal PWM block may be helpful since it relieves the load on the processor.

Further encoder inputs, additional memories and communication interfaces may also be provided. Depending on the application, the conversion of the regulator into a special hardware such as DSP, FPGA, ASIC and others may be advantageous.

Instead of programming a regulator as code in a microcontroller, it is conceivable to construct the regulator discretely. By suitable wiring of amplifiers, resistors and capacitors, as well as further components, the method according to the invention can also be constructed as hardware.

The power electronics arrangement 4 amplifies the pulse width-modulated signal produced by the microcontroller 3. With long feed lines and high requirements on the interference resistance, the power electronics arrangement can be galvanically separated from the control circuit and can be provided with a locally buffered power supply. A simple construction of the power electronics arrangement 4 with a switching FET and a free-wheeling diode is preferred. Further extension stages can be implemented as half bridges or full bridges. It is also possible to integrate further components into the power electronics arrangement, which can serve to monitor the state of the device or record further measurement values for current, voltage or temperature, or for example also for the heating of the energy absorber.

The controllable energy absorber 5 should as described above be coupled as robustly as possible to the path measurements. Preferably the path sensor 2 can be integrated into the energy absorber 5. An embodiment should be employed that is optimised with regard to the energy requirement and the reaction speed.

The optional components can include the trigger 6. This can be provided as additional security, in order to prevent a false release of the energy absorber 5 and restrict the maximum turn-on time, so that for example with software faults the electrically highly loaded hardware suffers no damage. As described above, it is also advantageous if the system is activated only in the event of an actually recognised impact. The lower energy requirement in the rest state protects the components and also allows the microcontroller time to take over other tasks, such as for example self-monitoring, the charging of the capacitor described above, or monitoring the voltage supply 1.

It is possible to design the system completely independently up to the power supply. The self-monitoring occurring in the system can signal possible defects to the user, for example by a control light. It is advantageous if the microcontroller 3 can communicate via a communications module 7 to other systems of the motor vehicle and for example is incorporated into a security bus 27. The security bus 27 can also provide the connection between the path sensor 2 and the control 100, as is schematically illustrated in FIG. 1. Furthermore intelligent retention systems can communicate with one another via the security bus 27 and attempt to minimise the consequences of an accident in the system as a whole. Thus, for example, the safety belt can determine via suitable sensors the deceleration of the driver and thereby already give the microcontroller 3 a starting value for the deceleration. It is also advantageous with fault diagnosis and state monitoring if the microcontroller 3 is connected via a communications module 7 to the other systems. The state of the system can thus also be read out via a workshop diagnostic instrument.

The telemetry module 8 can evaluate the available data of other vehicle systems or also from other vehicles involved in the accident (WLAN, mobile radio, LTE) and notify the microcontroller 3. In this way important parameters such as for example the type of accident, seriousness of the accident, driver's weight and driver's position can still be communicated before the impact against the steering wheel, following which the regulatory parameters can be adapted. The regulator can thereby be brought into the vicinity of the optimal curve path already at the beginning of the regulatory procedure, which again reduces the loading on the driver.

The regulation preferably also includes the ability to adjust a higher damping force of the energy absorber 5 already before the impact of the driver on the steering wheel, so that the steering wheel can be fixed at the start of the travel path against its intrinsic inertia at the beginning of the impact and a part of the travel path is not already spent at the start of the impact due to the inertia.

LIST OF REFERENCE NUMERALS

1. Voltage supply
2. Path sensor
3. Microcontroller
4. Power electronics arrangement
5. Energy absorber
6. Trigger device
7. Communications unit
8. Telemetry unit
9. Force behaviour mechanics
10. Force behaviour energy absorber
20 Coil
21 Magnetorheological fluid
22 Constriction point
23 Displaceable steering column part
24 Steering column part fixed to the vehicle body
25 Piston-cylinder unit
26 Steering wheel
27 Security bus
100 Control

What is claimed is:

1. A regulation method for a controllable energy absorber in a steering system in a motor vehicle, wherein in the energy absorber a current flow in a coil can be regulated, which controls the viscosity of a magnetorheological fluid of the controllable energy absorber, wherein during an accident the energy absorber acts as a hydraulic damper between two parts movable with respect to one another, whose damping force is determined, by the current flow through the magnetic coil, the method comprising:

determining, continuously or at intervals, a relative velocity, in a longitudinal direction, between a first part of the steering column movable with the steering wheel and a second part of the steering column fixed to the vehicle body, calculating an acceleration required for braking from the determined relative velocity to a standstill up to an end of a travel path, and calculating the current flow from the calculated acceleration in such a way that the value of the calculated acceleration is approximately reached during further travel of the parts movable with respect to one another.

2. The method according to claim 1, wherein the determining of the relative velocity is carried out repeatedly, and wherein at each measurement the travel path still available is determined.

3. The method according to claim 2, wherein the relative velocity and/or the travel path still available is calculated from the signals of a path sensor that detects the relative position of the parts of the steering column movable with respect to one another.

4. The method according to claim 1, further comprising determining one or more determinable parameters before and/or during an accident, and wherein on the basis of this determining, one or more regulator parameters of the regulation method are altered.

5. The method according to claim 1, further comprising increasing the damping force during inflation of an airbag.

6. The method according to claim 1, wherein, during an accident, the relative velocity of a displaceable part of the steering column is reduced from an initial relative velocity corresponding to an impact velocity caused by the accident, by means of the energy absorber acting as a hydraulic damper between the two parts of the steering column.

7. The method according to claim 1, wherein the current flow is controlled by means of a feedback control loop.

8. A regulation method for a controllable energy absorber in a steering system in a motor vehicle, wherein in the energy absorber a current flow in a coil can be regulated, which controls the viscosity of a magnetorheological fluid of the controllable energy absorber, wherein during an accident the energy absorber acts as a hydraulic damper between two parts movable with respect to one another, whose damping force is determined by the current flow through the magnetic coil, the method comprising:

determining, continuously or at intervals, a relative velocity, in a longitudinal direction, between a first part of the steering column movable with the steering wheel and a second part of the steering column fixed to the vehicle body, calculating at least once a behaviour of a velocity required for braking from the determined relative velocity to a standstill up to an end of a travel path, and calculating the current flow from the determined relative velocity and the calculated velocity behaviour in such a way that a calculated necessary behaviour of the velocity is approximately achieved during further travel of the parts movable with respect to one another.

9. The method according to claim 8, wherein the determining of the relative velocity is carried out repeatedly, and wherein at each measurement the travel path still available is determined.

10. The method according to claim 9, wherein the relative velocity and/or the travel path still available is calculated from the signals of a path sensor that detects the relative position of the parts of the steering column movable with respect to one another.

11. The method according to claim 8, further comprising determining one or more determinable parameters before and/or during an accident, and wherein on the basis of this determining, one or more regulator parameters of the regulation method are altered.

12. The method according to claim 8, further comprising increasing the damping force during inflation of an airbag.

13. The method according to claim 8, wherein, during an accident, the relative velocity of a displaceable part of the steering column is reduced from an initial relative velocity corresponding to an impact velocity caused by the accident, by means of the energy absorber acting as a hydraulic damper between the two parts of the steering column.

14. The method according to claim 8, wherein the current flow is controlled by means of a feedback control loop.

15. A device for regulating a controllable energy absorber for a steering system in a motor vehicle having a body, the steering system including a steering column, the device comprising:

a piston-cylinder unit through which a magnetorheological fluid is forced through a constriction in the event of a crash, wherein the viscosity of the magnetorheological fluid at the constriction can be altered by the current flow through a coil, whereby the damping force can be adjusted, and a sensor unit configured to determine a relative position, along a longitudinal direction, of a movable part of the steering column with respect to a part of the steering column fixed to the vehicle body.

16. The device according to claim 15, wherein the sensor unit is integrated in an energy absorber.

17. The device according to claim 15, wherein the device is configured to control the viscosity of the magnetorheological fluid by means of a feedback control loop.

* * * * *